H. T. CUSHMAN.

Rolling Pocket-Tablets.

No. 8,875. Reissued Sept. 2, 1879.

WITNESSES:

J. A. Miller Jr.

William L. Rogers.

INVENTOR:

Henry T. Cushman by Joseph A. Miller

Attorney

N. PETERS, PHOTO-LITHOGRAPHER, WASHINGTON, D. C.

UNITED STATES PATENT OFFICE.

HENRY T. CUSHMAN, OF NORTH BENNINGTON, VERMONT.

IMPROVEMENT IN ROLLING POCKET-TABLETS.

Specification forming part of Letters Patent No. 196,636, dated October 30, 1877; Reissue No. 8,875, dated September 2, 1879; application filed May 5, 1879.

*To all whom it may concern:*

Be it known that I, HENRY T. CUSHMAN, of North Bennington, in the county of Bennington and State of Vermont, have invented an Improved Rolling Pocket-Tablet; and I do hereby declare that the following is a full, clear, and exact description of the same, reference being had to the accompanying drawings, forming part of this specification.

The object of this invention is to construct a slate of moderate dimensions of flexible material, adapted to be rolled or coiled in a tubular case, which case is of such limited dimensions that it may be conveniently carried in the pocket.

Figure 1:
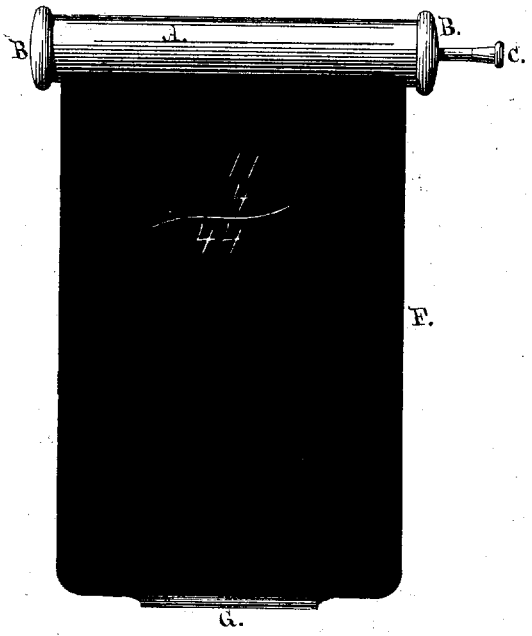
Figure 2:
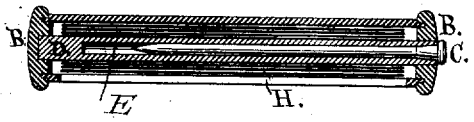
Figure 3:
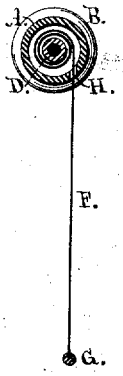

Figure 1 is a view of my improved slate, showing the slate-tablet unrolled and figures marked on the black slate with a slate-pencil, showing white figures on a black ground. Fig. 2 is a sectional view of the case into which the flexible slate is rolled, and by which the same is protected. It also shows the central roller provided with a receptacle for a pencil and the pencil. Fig. 3 is a cross-section at right angle with the axis of the case, showing the slate partially unrolled.

In the drawings, A is a tubular cylinder, made from any suitable material, having each end thereof closed by a loose head, B. One of the heads B B is firmly attached to each end of the roller D, which passes through the center of the cylinder A, and to which the flexible slate, cloth, or tablet is securely attached. The inner faces or sides of the heads B B are provided with annular grooves to receive the annular shoulder-projections of cylinder A, which are respectively so adapted to each other that when rotated the roller shall maintain a central position, and the cylinder be so protected or shielded at its ends as not to be easily crushed. This may be accomplished in the manner shown in Fig. 2, or in any other convenient way.

The central portion or core of the roller is bored or chambered out, so as to make a pocket, E, for the reception of the pencil C. (Shown in Figs. 1 and 2.) The slate-cloth F, being attached by one end thereof to the roller D, runs in and out of the case A through a longitudinal slot, H, Figs. 1 and 3, provided therefor, and has a small fillet of wood, G, or any other suitable substitute, attached to the outer or free end thereof, which may be grasped to draw out or unroll the slate, and which also prevents the outer end of the slate from being entirely drawn into the case in process of rolling up.

The pencil C is provided with a small flanged cap or shield, which forms a head thereto, the neck of which is made slightly tapering, as shown, which prevents its being easily displaced from its pocket E when not in use.

Work remaining on either or both sides of the slate may be rolled into the case without danger of erasure.

I am aware that curtains have before my present invention been made to roll into a tubular case. I am also aware that stamp-sheets and similar articles have been heretofore rolled into sheets, and I lay no claim to the invention of the flexible slate; but by combining a tubular case provided with a longitudinal slit with a central roller, the ends of which are provided with rounded heads having annular grooves to receive the tubular case, with a flexible prepared slate, on which writing and figuring can be done with a slate-pencil, which can be easily erased, a new, convenient, and desirable article is produced, which can be carried in a pocket, and which will protect the easily-erasible marks or figures of a slate-pencil better than slates as heretofore constructed.

The invention is conveniently portable, durable, and possesses one characteristic which especially commends its use in schools—namely, of being absolutely noiseless when in use.

Having thus described my invention, I claim as new and desire to secure by Letters Patent—

1. A pocket-slate consisting, essentially, in the combination, with a tubular case and a roller located therein, of a flexible slate secured at one end to the roller and adapted to be rolled up within the tubular case, substantially as set forth.

2. The combination, with a tubular case provided with a longitudinal slot, a roller located within said case, and heads secured to the opposite ends of the roller, (said heads furnished with grooves to receive the opposite ends of the tubular case,) of a flexible slate secured at one end to the roller and adapted to be rolled up within the tubular case, substantially as set forth.

3. The roller D, constructed with pencil-pocket, in combination with case A and flexible slate F, all as shown and specified.

4. As an article of manufacture, a flexible slate mounted upon a roller, provided with a pencil-pocket, and adapted to be rolled or coiled for protection and transportation into a tubular case, substantially as described and set forth.

HENRY T. CUSHMAN.

Witnesses:
FRANKLIN SCOTT,
F. R. HUDSON.